Oct. 2, 1923. Re. 15,695

L. A. NARES

TIRE RACK FOR AUTOMOBILES

Original Filed March 18, 1915 2 Sheets-Sheet 1

Lewelyn Arthur Nares Inventor

By his Attorney

James Hamilton

Oct. 2, 1923. Re. 15,695

L. A. NARES

TIRE RACK FOR AUTOMOBILES

Original Filed March 18, 1915 2 Sheets-Sheet 2

Lewerlyn Arthur Nares Inventor

By his Attorney

James Hamilton

Reissued Oct. 2, 1923.

Re. 15,695

UNITED STATES PATENT OFFICE.

LLEWELYN A. NARES, OF FRESNO, CALIFORNIA.

TIRE RACK FOR AUTOMOBILES.

Original No. 1,150,696, dated August 17, 1915, Serial No. 15,246, filed March 18, 1915. Application for reissue filed April 2, 1917. Serial No. 159,337.

*To all whom it may concern:*

Be it known that I, LLEWELYN A. NARES, a citizen of the United States, and a resident of Fresno, in the county of Fresno and State of California, have invented a new and Improved Tire Rack for Automobiles, of which the following is a full, clear, and exact description.

This invention relates to a rack applied to an automobile body for the purpose of carrying extra tires.

The invention has for its general objects to improve and simplify the construction of automobile racks so as to be reliable and efficient in use, comparatively simple and inexpensive to manufacture and so designed that the tires can be easily and quickly locked or unlocked.

A further object of the invention is the provision of a rack for supporting one or more tires, the rack embodying a plurality of gripping members similtaneously engageable with or disengaging from the tires by means of novelly arranged links which serve to lock the tire-engaging arms in tire-holding position.

With such objects in view, and others which will appear as the description proceeds, the invention comprises various novel features of construction and arrangement of parts which will be set forth with particularity in the following description and claims appended hereto.

Figure 2:
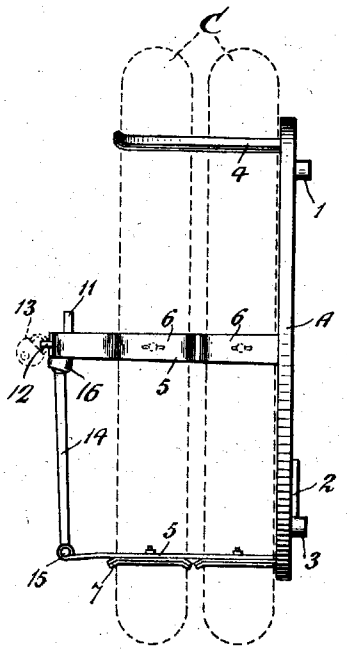
Figure 1:
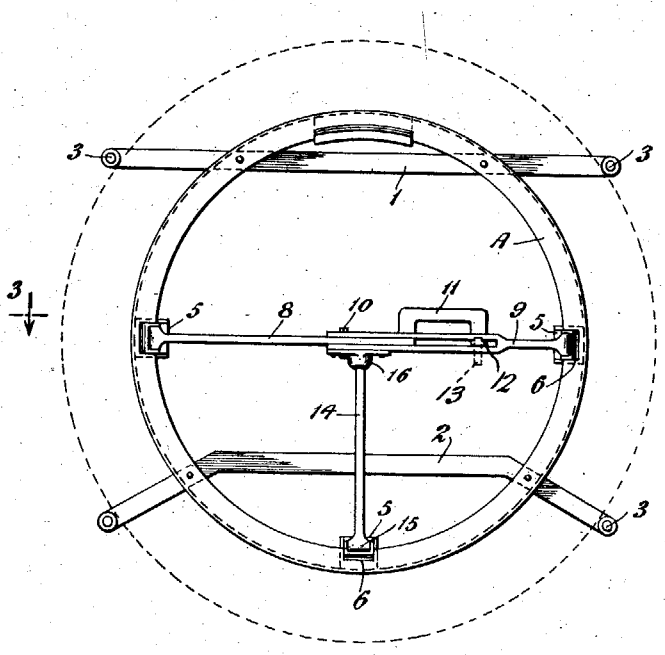
Figure 4:
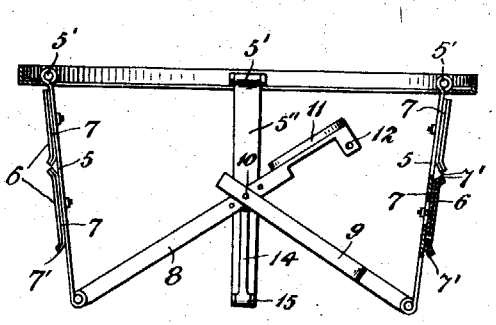
Figure 3:
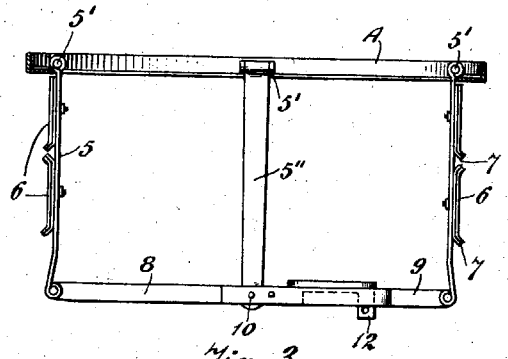

In the accompanying drawings, which illustrate one embodiment of the invention and wherein similar characters of reference indicate corresponding parts in all the views, Figure 1 is an elevation of the rack showing the parts of the rack in tire-holding position; Fig. 2 is a side view of Fig. 1; Fig. 3 is a sectional view on the line 3—3, Fig. 1, with the tire-engaging members in locked position; Fig. 4 is a similar view with the said members in unlocked position, and Fig. 5 is an edge view showing the tires locked in the rack.

Figure 5:
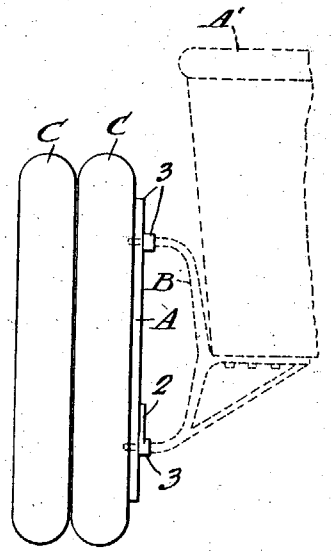

Referring to the drawings, A designates the base ring of the rack, which is fastened rigidly to the vehicle body A′, by any suitable means, such as upper and lower cross bars 1 and 2, to which the ring is bolted or otherwise fastened, and the ends 3 of these rods are secured to suitable brackets B on the vehicle body A′, as shown in Fig. 5. Extending horizontally from and rigidly secured to the top of the ring A is a fixed arm 4 which sustains the weight of the extra tire or tires C, and cooperating with this arm 4 are several locking arms 5, 5″, which extend within and engage the tires C at a plurality of points. In the present instance, three of these movable arms 5, 5″, are employed, there being two side movable arms 5 and a bottom movable arm 5″. These movable arms 5, 5″, which are hinged at 5′ on the ring A, have adjustable leather-faced seat-elements 6 so shaped as to engage the rims of the demountable tires C. Each seat 6 comprises a metal strip 7 having its ends 7′ bent so as to engage the edges of the tire rim and prevent displacement of the latter in the rack. The side-arms 5 are locked in tire-holding position by a pair of toggle-links 8, 9, which are hingedly connected at 10, by a bolt or equivalent means. These links 8, 9, are of such length that, when they are in alinement, the side-arms 5 will be in tire-holding position; but, by throwing the links 8, 9, inwardly, as shown in Fig. 4, the side-arms 5 are drawn toward each other, whereby the tires C are released. As is shown in the drawings, the toggle-links 8, 9, are of substantially the same length, with the result that the tire-engaging arms 5 are thrown into and out of contact simultaneously with the tire-rims; and the pressure exerted by them against the tire-rims is substantially the same. The arms 5 take a grip upon the tire-rims at points which are at extremities of a diameter of these rims and bear more squarely against the latter than they would, were the toggle-links to lie in a chord of the circle of the rims, instead of in a diameter thereof. Consequently this arrangement of the toggle-links and the tire-engaging arms result in a peculiarly effective and firm gripping of the tire-rims and in the prevention of any creeping or slipping of the tire relatively to the tire-rim.

To operate conveniently these toggle-links, the link 8 has an offset portion forming the grip or handle 11, which lies above the plane of the link 9, the latter link being slotted to receive the inner end of the link 8, and also to permit a lug 12 to project through the link 9. To this lug 12, there is applied a padlock 13, whereby the rack is locked against opening, except by an authorized person. A link 14 is connected with the lower arm 5″ and also with the toggle-links 8, 9, whereby the lower arm 5″ is moved inwardly or outwardly with the corresponding movement of the side-arms 5. A hinge-joint 15 connects the link 14 with the lower arm 5″, while a ball-and-socket joint 16 connects the upper or inner end of the link 14 with the link 9. Since the toggle-links 8, 9, move in a horizontal plane, the upper end of the link 14 moves also in a horizontal plane; consequently, the lower end of the link 14 moves upwardly, when the toggle-links 8, 9, are moved inwardly and thereby the lower arm 5″ is swung inwardly to release the tires C. When the links 8, 9, are locked in position, the tire-holding members 5, 5″, obviously cannot be moved inwardly out of engagement with the tires C, from which it results that the tires C are locked in the rack and cannot be removed, until the links 8, 9, are thrown from the position shown in Fig. 3 to that shown in Fig. 4. To lock and unlock the tires C, it is necessary merely to grip the handle 11 and throw the same inwardly or outwardly or in a direction toward or from the base ring A.

From the foregoing description taken in connection with the accompanying drawings, the advantages of the construction and method of operation of the tire-carrier hereinbefore described will be readily understood by those skilled in the art to which the invention appertains; and, while I have described the principle of operation, together with the device which I now consider to be the best embodiment thereof, I desire to have it understood that the device shown is merely illustrative and that such changes as are within the scope of the appended claims may be made, when desired. For example, the link 14 may obviously be disconnected from the links 8, 9, in which case the link 14 and the arm 5″ will be dispensed with. It is to be observed that the swinging tire-engaging arms 5 are mounted within the base-ring A and are limited thereby in their outward swing or travel. It is furthermore to be observed that the toggle-links 8, 9, are arranged to swing horizontally inwardly and outwardly towards and from the automobile A′ and axially of the tires C, from which there result ease and freedom of manipulation, compactness of structure and sightliness of appearance. Moreover, as is common in automobile construction, a gasoline-tank may be mounted on the rear of the automobile and arranged in such a position that the horizontally-moved toggle-links 8, 9, will pass above the tank freely. By giving to the base-member A an annular shape, a support is provided for the innermost tire throughout its circular length. Again, the ring form of the base member A permits the same to be readily manufactured from light, strong material, such as angle-iron, at low cost; and the flange of the angle-iron serves as a place of attachment for the hinged ends of the tire-engaging arms 5, 5″ (Figures 3 and 4) and a gauge for the rim of the tire and limits, also, the outward swing of these arms. Furthermore, the use of angle-iron allows the attaching-irons or cross-bars 1, 2, to be fastened to the base-member A, whereby the tire-rack may be made with attaching-irons adapted to fit the car in the desired manner, or to fit in the place of the old attaching-irons of another tire-rack that has been removed for replacement with the tire-rack herein illustrated and described. Tire-racks in which the attaching-irons operate as tire-carrier parts have proven to be failures as commercial devices. Since, moreover, the tire-engaging arms 5, 5″, are located at the ends of diameters of the base-ring A, and are given a substantial width across their tire-engaging faces and relatively to their thickness (see Figs. 2, 3 and 4), they serve to grip the tire with a firm hold and in such fashion that the tire cannot move in any direction (that is, slip or "creep") and there is no danger of the valve-stem's being sheared off. The fact that the tire-engaging arms 5, 5″, are hinged makes their tire-engaging action more efficient than would be the case, were mere resiliency depended upon.

I claim:

1. A tire-holding rack comprising a base ring, a fixed arm on the top of the ring and projecting laterally therefrom, three arms hinged on the ring and circumferentially disposed one from another approximately ninety degrees, tire-engaging means on all the arms, and connecting means between the hinged arms for simultaneously moving all of them outwardly into tire-engaging position, or inwardly into tire-releasing position.

2. A tire-carrying rack comprising a base element, means thereon for suspending the weight of the tire or tires to be carried, a pair of diametrically disposed tire-engaging arms movably mounted on the base element, a pair of toggle links connected with the arms, one of the links being slotted and the other link having an extremity extending through the slot from one side, a lock attached to the extremity at the side of the slotted link opposite from the side from which the said extremity enters the slot for preventing collapsing of the toggle links, and an upstanding loop on the lock-receiving link to form a handle for operating the toggle links.

3. A tire-carrying rack for automobiles, comprising a tire-supporting structure, three tire-engaging elements hingedly mounted on the said structure, toggle links connecting two of the elements for throwing the same into or out of tire-engaging position, a link connected with the third element and hingedly connected with the said toggle links, whereby the third element moves into and out of tire-engaging position simultaneously with the other elements.

4. A tire rack for automobiles comprising a tire-supporting structure, three tire-engaging arms hingedly mounted on the structure, links hingedly connected with the outer ends of the arms, a pivot connecting two of the links together, a ball and socket joint between the third link and one of the other links, and locking means for holding the links in a position with the arms engaged with the tires.

5. A tire-carrier for automobiles comprising a tire-supporting base constructed to be fastened to the automobile; a pair of tire-engaging arms hinged to said base; and a pair of toggle-links pivotally fastened together at their inner ends and to said arms at their outer ends, the inner ends of said toggle-links being capable of a swinging movement inwardly and outwardly towards and from said base and substantially axially of the tires and said arms being arranged to engage the latter at the ends of a diameter thereof.

6. A tire-carrier for automobiles comprising a tire-supporting base constructed to be fastened to the automobile; a rigid, tire-supporting arm projecting from said base; a pair of tire-engaging arms hinged to said base and free from connection with said fixed arm; and a pair of toggle-links pivotally fastened together at their inner ends and to said arms at their outer ends, said arms being positioned on the base for engagement with the tires at ends of a diameter thereof.

7. A tire-carrier for automobiles comprising a tire-supporting base constructed to be fastened to the automobile; a pair of tire-engaging arms hinged to said base and mounted to swing within the same and limited in their outward swing thereby; and a pair of toggle-links pivotally fastened together at their inner ends and to said arms at their outer ends, said arms being positioned on the base for engagement with the tires at ends of a diameter thereof.

8. A tire-carrier for automobiles comprising a supporting base constructed for attachment to the automobile and including a tire-supporting ring; a rigid, tire-supporting arm projecting therefrom; a pair of tire-engaging arms hinged to the ring and arranged to swing within the same and limited in their outward swing thereby; and a pair of toggle-links pivotally fastened together at their inner ends and to the hinged tire-engaging arms at their outer ends.

9. A tire-carrier for automobiles comprising a supporting base constructed for attachment to the automobile and including a flanged tire-supporting ring; a pair of tire-engaging arms hinged to the ring and arranged to swing within the same and limited in their outward swing thereby; and a pair of toggle-links pivotally fastened together at their inner ends and to the hinged tire-engaging arms at their outer ends.

10. A tire-carrier for automobiles comprising a supporting base constructed for attachment to the automobile and including a tire-supporting ring; a pair of tire-engaging arms hinged to the ring and arranged to swing within the same; and a pair of toggle-links which extend substantially parallel to a diameter of the ring and which are pivotally fastened together at their inner ends and to the tire-engaging arms at their outer ends.

11. A tire-carrier for automobiles comprising a supporting base constructed for attachment to the automobile and including a tire-supporting ring; a pair of tire-engaging arms hinged to the ring and positioned thereon to swing into engagement with the tires at points diametrically opposite each other; and a pair of toggle-links the inner ends of which are pivotally fastened together and the outer ends of which are pivotally fastened to the tire-engaging arms.

12. A tire-carrier for automobiles comprising a supporting base constructed for attachment to the automobile and including a tire-supporting ring; a pair of tire-engaging arms hinged to the ring at points diametrically opposite each other; and a pair of toggle-links which extend substantially parallel to a diameter of the ring and which are pivotally fastened together at their inner ends and to the tire-engaging arms at their outer ends.

13. A tire-carrier for automobiles comprising a supporting base constructed for attachment to the automobile and including a flanged tire-supporting ring; a pair of tire-engaging arms hinged to the ring at points diametrically opposite each other; and a pair of toggle-links which extend substantially parallel to a diameter of the ring and which are pivotally fastened together at their inner ends and to the tire-engaging arms at their outer ends.

14. A tire-carrier for automobiles including a supporting base constructed for attachment to the automobile; a rigid tire-supporting arm projecting laterally from the base; a pair of tire-engaging arms hinged to the latter and free from link connection with the rigid arm; and toggle-links which are pivotally connected to the tire-engaging arms and which throw the same into and out of engagement with the tires.

15. A tire-carrier for automobiles including a supporting base constructed for attachment to the automobile; a rigid tire-supporting arm projecting laterally from the base; a pair of tire-engaging arms hinged to the latter and free from link connection with the rigid arm and positioned on the base to swing into engagement with the tires at points diametrically opposite each other; and toggle-links which are pivotally connected to the tire-engaging arms and which throw the same into and out of engagement with the tires.

16. A tire-carrier for automobiles comprising a supporting base constructed for attachment to the automobile and including a tire-supporting ring; a pair of tire-engaging arms hinged to the ring at points diametrically opposite each other and formed with relatively wide, tire-engaging faces that are arranged to bear against the tires at the ends of a diameter thereof; and a pair of toggle-links which extends substantially parallel to a diameter of the ring and which are pivotally fastened together at their inner ends and to the tire-engaging arms at their outer ends.

17. A tire-carrier for automobiles, including a ring-shaped tire-supporting base constructed for attachment to the automobile; a pair of tire-engaging arms hinged to the base at points diametrically opposite each other; and a pair of toggle-links connected to said arms and lying substantially parallel to a diameter of the circle of said base.

18. A tire-carrier for automobiles, including a ring-shaped tire-supporting base constructed for attachment to the automobile; a fixed tire-supporting arm projecting from the base; a pair of tire-engaging arms hinged to said base at points substantially ninety degrees from said fixed arm; and a pair of toggle-links connected to said arms and lying substantially parallel to a diameter of the circle of said base.

19. A tire-carrier for automobiles, including a base-frame constructed for attachment to the automobile; a pair of tire-engaging arms hinged to said base-frame; and a pair of toggle-links connected to said arms; said toggle-links being substantially of the same length.

20. A tire-carrier for automobiles, including a ring-shaped tire-supporting base constructed for attachment to the automobile; a pair of tire-engaging arms hinged to the base at points diametrically opposite each other; and a pair of toggle-links connected to said arms; said toggle-links being of substantially the same length, and lying substantially parallel to a diameter of the circle of said base.

Signed at Fresno, in the county of Fresno and State of California, this 28th day of February, 1917, in the presence of the two undersigned witnesses.

L. A. NARES.

Witnesses:
J. W. THORBURN,
I. GEILMAN.